INVENTORS,
Theodore M. Johnson
BY & Edgar G. Reed

Patented Apr. 6, 1948

2,439,135

UNITED STATES PATENT OFFICE 2,439,135

MOVABLE BASE MOUNTED AXIALLY COL-
LAPSING TYPE TIRE REMOVING DEVICE

Theodore M. Johnson, Burbank, and Edgar G.
Reed, Los Angeles, Calif.

Application January 25, 1945, Serial No. 574,450

3 Claims. (Cl. 157—6)

1

Our invention relates to tire removing tools, and more particularly to a tire removing tool designed for removing a tire from a wheel without removing the wheel from the vehicle; and it has among its salient objects: To provide a tire removing tool mounted upon a carrier which can be moved on wheels up to a wheel, much as is a lifting jack, and operated for removing the tire from the wheel while the wheel remains on the vehicle; to provide a tool of the character referred to, having two arms which can be brought up to the opposite sides of the tire and which arms have power means for operating them together against the opposite sides of the tire in such a way as to press the opposite sides of the tire inwardly and into the middle clearance space in the tire rim; to provide a tire removing tool having cooperating arms for compressing the tire at its opposite sides and with a cylinder with pistons therein connected with said arms for furnishing the power for simultaneously operating said arms for removing the tire; to provide in connection with the two arms of a tire removing tool, latch means for catching on the outside of the edges of the rim for holding the tool in operating position; and, in general, to provide a new and improved tire removing tool which is practical and efficient in removing tires from wheel rims without removing the wheel from the vehicle.

In order to fully explain our invention, we have shown one practical embodiment thereof on the drawings herewith, which we will now describe.

Referring to the drawings in detail:

Figure 4 is a sectional view taken on the line 4—4 of Fig. 1; and

Figure 5 is a fragmentary sectional view taken on the line 5—5 of Fig. 1.

Figure 1:
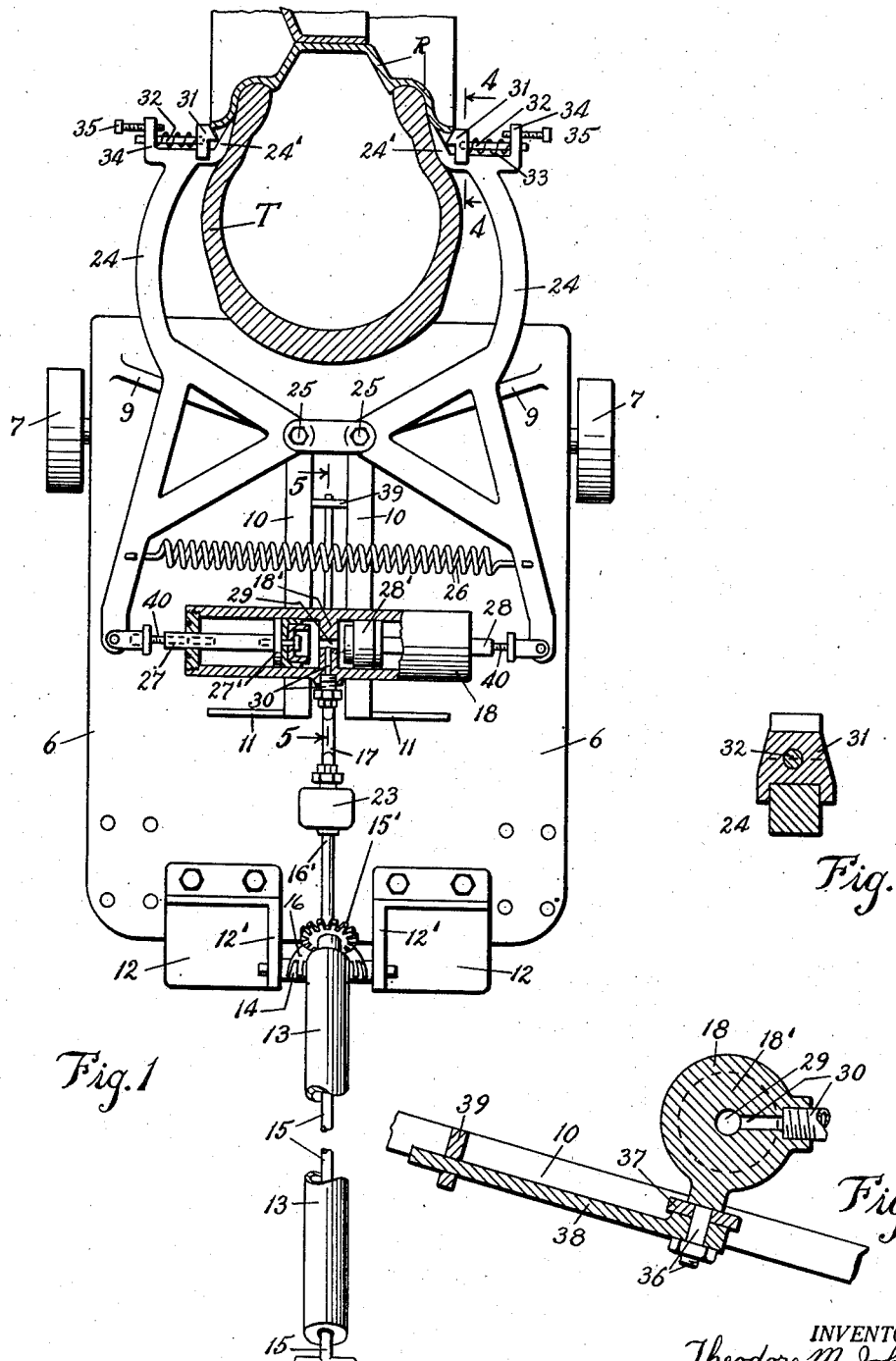
Figure 1 is a plan view looking down upon a tire removing tool embodying our invention, showing the rim and tire in section.

Referring now in detail to the drawings, our invention is shown mounted on a carrier base or platform 6, having front wheels 7, 7, and castor wheels, as 8. Mounted on the front of said base or platform is an upstanding frame structure 9, 9, with an inclined track-way 10, made of angle irons and extended rearwardly to a supporting member 11 for each track member.

In the rear of said base or platform are two

2 foot plates 12, 12, for holding the tool forwardly toward the tire with the foot, said plates also having adjacent side portions 12', 12', between which an operating tubular handle member 13 is pivotally supported on a depending arm 21, the pivot being designated 14. A valve operating rod 15 is shown extended through said tubular handle 13, and provided with a gear 15', in mesh with a cup-like gear 16 on a valve rod 16' extended into a reservoir and valve mechanism designated 23 and from which a flexible hose 17 extends to a cylinder 18, mounted on the trackway 10, and again referred to.

A hydraulic pump 19 is shown under said base or platform 6 with piston rod 20, connected with the arm 21, on said handle 13, as at 22, whereby the movement of said handle 13 and rod 15 up and down slightly, operates said pump in a well known manner, for forcing the fluid into the cylinder 18, from the reservoir 23, in any suitable manner. This mechanism, of itself, is no part of the present invention, as any power developing means can be used with the cylinder 18 for operating the tire compressing arms, which we will now describe and which constitute the real invention of this application.

Our invention resides largely in the provision of two tire pressing arms, designated 24, 24, pivotally supported, as at 25, 25, on the upstanding frame structure 9, 9, with their rearward ends connected with a coiled spring 26, and with two piston rods, 27 and 28, on pistons 27' and 28', shown in light broken lines in the cylinder 18, before referred to. Said cylinder has a partition 18' formed therein, separating the opposite ends of the cylinder, with a communicating port 29 therein and with a fluid supply connection at 30, as shown in the sectional view in Fig. 1, whereby the operating fluid can be directed into the adjacent ends of said cylinder 18, for moving the pistons and piston rods outwardly, for spreading the rearward ends of said tire pressing arms 24, 24, as clearly indicated in said Figs. 1 and 2, and thus compressing the forward or operating ends of said arms toward each other.

The tire engaging ends of said arms or prongs 24, 24, are provided with flat feet portions, as 24', 24', and with a latch mechanism for catching on the edges of the rims as the tool is pressed into place between the rim and the opposite sides of the tire. Slidably mounted on the ends of said arms 24, 24, near the feet portions 24', 24', are two hook latch members, as 31, 31, each having a stem, as 32, on which is a coiled spring 33, said stem operating through a lug portion 34, on the end of each arm 24, as shown. A set screw 35 is shown for determining the movement of the arm inwardly, as indicated in Fig. 2.

Figure 2:
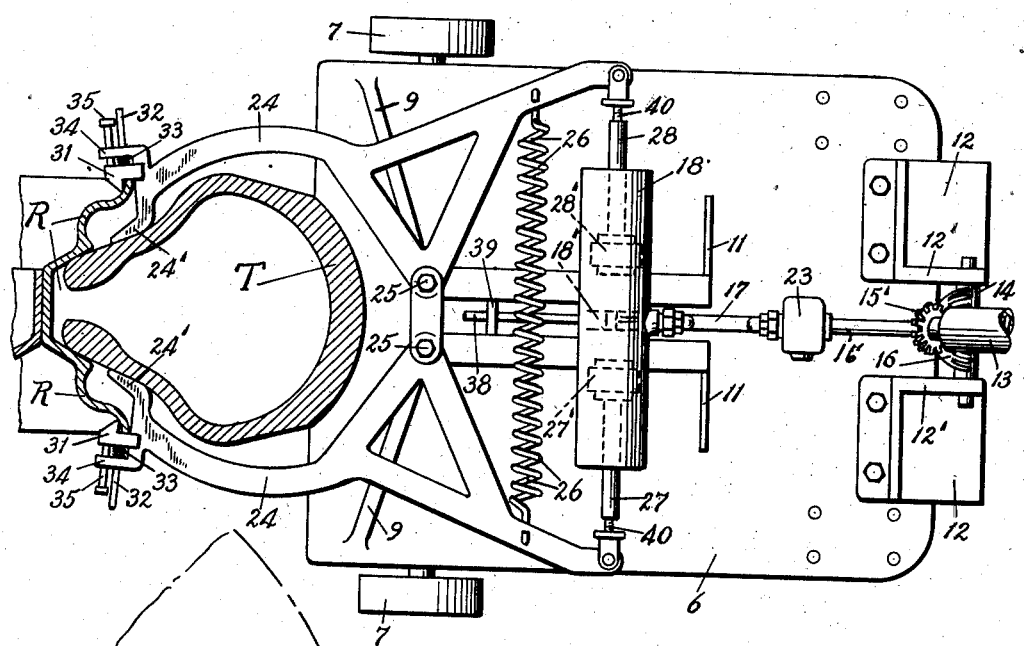
Figure 2 is a similar view, showing the arms moved inwardly, with the tire beads in the clearance space in the middle of the rim.
Figure 3:
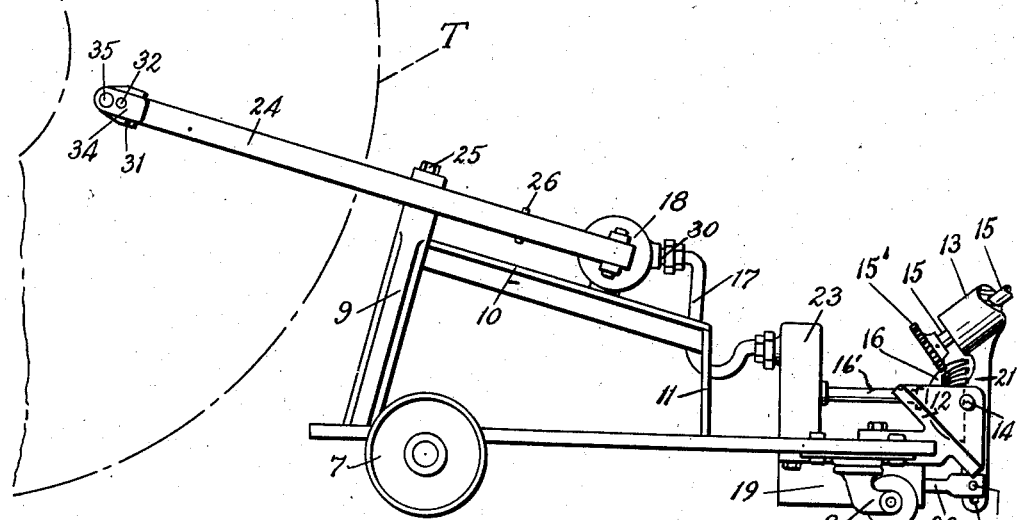
Figure 3 is a side elevation of the tire removing tool.

The function of these latch mechanisms is well illustrated in Figs. 1 and 2. In Fig. 1, as the tool is being forced toward the tire so as to insert the feet portions 24′, 24′ of the arms 24, 24, between the rim R and the tire T, the latch hook 31 will be pushed past the edge of the rim R until it hooks on the edge of said rim R, as seen in Fig. 2. This holds the tool against backing off or moving irregularly, as both sides, or both arms are held on the rim.

Referring to Fig. 5, the cylinder 18 is provided with a depending screw or bolt 36, with a washer like roller 37 thereon, operating between the track members 10, and with a forwardly extending rod or member 38, sliding through a guide element 39, between said track members 10, for holding said cylinder 18 from rocking, or tilting, as it moves slightly with the operation of said tire-engaging arms or prongs 24, 24.

The piston rods 27 and 28, of the cylinder 18, are adjustably connected with said arms, as at 40, with a screw connection, for a purpose which will be obvious in getting accurate adjustments for the operating arms 24, 24, which compress the opposite sides of the tire into the clearance space R′ of the rim R.

We do not limit our invention to the details of construction and arrangement here shown for explanatory purposes, except as we may be limited by the hereto appended claims.

We claim:

1. A tire removing tool including a carrier therefor, two arms movable toward and from each other to embrace and compress the opposite sides of a tire while on an upstanding wheel, power means operable on said arms for forcing them toward each other against the opposite sides of said tire adjacent the rim, latch elements on the ends of said tire-engaging arms to hook over the opposite sides of the rim to hold the tool to the wheel, and manually operable means for moving said carrier and said arms into position to engage said tire and for removing it.

2. A tire removing tool including a carrier to be moved on the floor, a pair of arms pivotally mounted on said carrier and held in position to embrace the opposite sides of a tire on an upstanding wheel when said carrier is moved up to said wheel, power means operable between said arms for forcing their ends toward each other on the opposite sides of said tire and into the opposite sides of the rim, for compressing them inwardly, latch means on the ends of said arms to automatically hook over the edges of the rim for holding said tool to the wheel, and manually operable means for controlling the said power means.

3. A tire removing tool of the character referred to including a carrier base, two pivoted arms mounted thereon with their outer, or operating ends provided with tire-engaging feet to operate between the opposite sides of a tire and the opposite inside edges of the upstanding rim on which the tire is mounted, said arms also having spring latch means positioned to engage and hook on to the outside edges of said rim to hold said arms in place as they are operated to compress the opposite sides of the tire inwardly, power means operable between the ends of said arms for moving them together at their tire compressing ends, spring means for returning said arms in normal positions, and manually operable means for moving said carrier base and for controlling said power means.

THEODORE M. JOHNSON.
EDGAR G. REED.

REFERENCES CITED

The following references are of record in the file of this patent:

UNITED STATES PATENTS

| Number | Name | Date |
| --- | --- | --- |
| 1,066,210 | Mahon | July 1, 1913 |
| 1,936,817 | Allen | Nov. 28, 1933 |
| 1,964,119 | Hendry | June 26, 1934 |
| 1,966,766 | Raby et al. | July 17, 1934 |
| 2,043,169 | Hawkinson | June 2, 1936 |
| 2,212,768 | Bonneau | Aug. 27, 1940 |
| 2,281,476 | Casey | Apr. 28, 1942 |
| 2,326,684 | Ross | Aug. 10, 1943 |